United States Patent
Blachly et al.

[15] 3,678,246
[45] July 18, 1972

[54] LIQUID HEATING VESSEL

[72] Inventors: Donald L. Blachly, Glendale; Jack E. Weidner, Fox Point, both of Wis.

[73] Assignee: John Oster Manufacturing Co., Milwaukee, Wis.

[22] Filed: June 24, 1970

[21] Appl. No.: 48,978

[52] U.S. Cl.....................................219/437, 99/281, 219/441
[51] Int. Cl...........................................................F27d 11/02
[58] Field of Search..................219/436–439, 441–442, 219/430–435, 316, 318, 335–336; 99/280–282

[56] References Cited

UNITED STATES PATENTS

| | | | |
|---|---|---|---|
| 1,441,131 | 1/1923 | Soutter | 219/437 |
| 2,722,595 | 11/1955 | Kolb | 219/441 X |
| 3,535,493 | 10/1970 | Schwartz, Jr. et al. | 219/441 |
| 3,138,698 | 6/1964 | Wells et al. | 219/441 |
| 3,369,105 | 2/1968 | Wheeler | 219/441 |
| 3,303,327 | 2/1967 | Himelsbaugh | 99/281 X |
| 2,773,166 | 12/1956 | Best | 219/441 |
| 1,464,255 | 8/1923 | Zimmermann | 219/437 X |
| 3,423,571 | 1/1969 | Trachtenberg et al. | 219/441 |
| 3,022,411 | 2/1962 | Soper et al. | 219/441 |
| 3,059,092 | 10/1962 | Olson | 219/441 |

FOREIGN PATENTS OR APPLICATIONS

| | | | |
|---|---|---|---|
| 598,032 | 2/1948 | Great Britain | 219/441 |
| 802,461 | 2/1951 | Germany | 219/437 |

*Primary Examiner*—Volodymyr Y. Mayewsky
*Attorney*—George R. Clark

[57] ABSTRACT

An appliance for heating a quantity of liquid in a molded plastic vessel with a heating element cast into a lug which extends upwardly into the water containing portion of the vessel. The energization of the heating element is controlled by a thermostat positioned at the bottom of the vessel in good heat transfer relation with the vessel contents.

15 Claims, 9 Drawing Figures

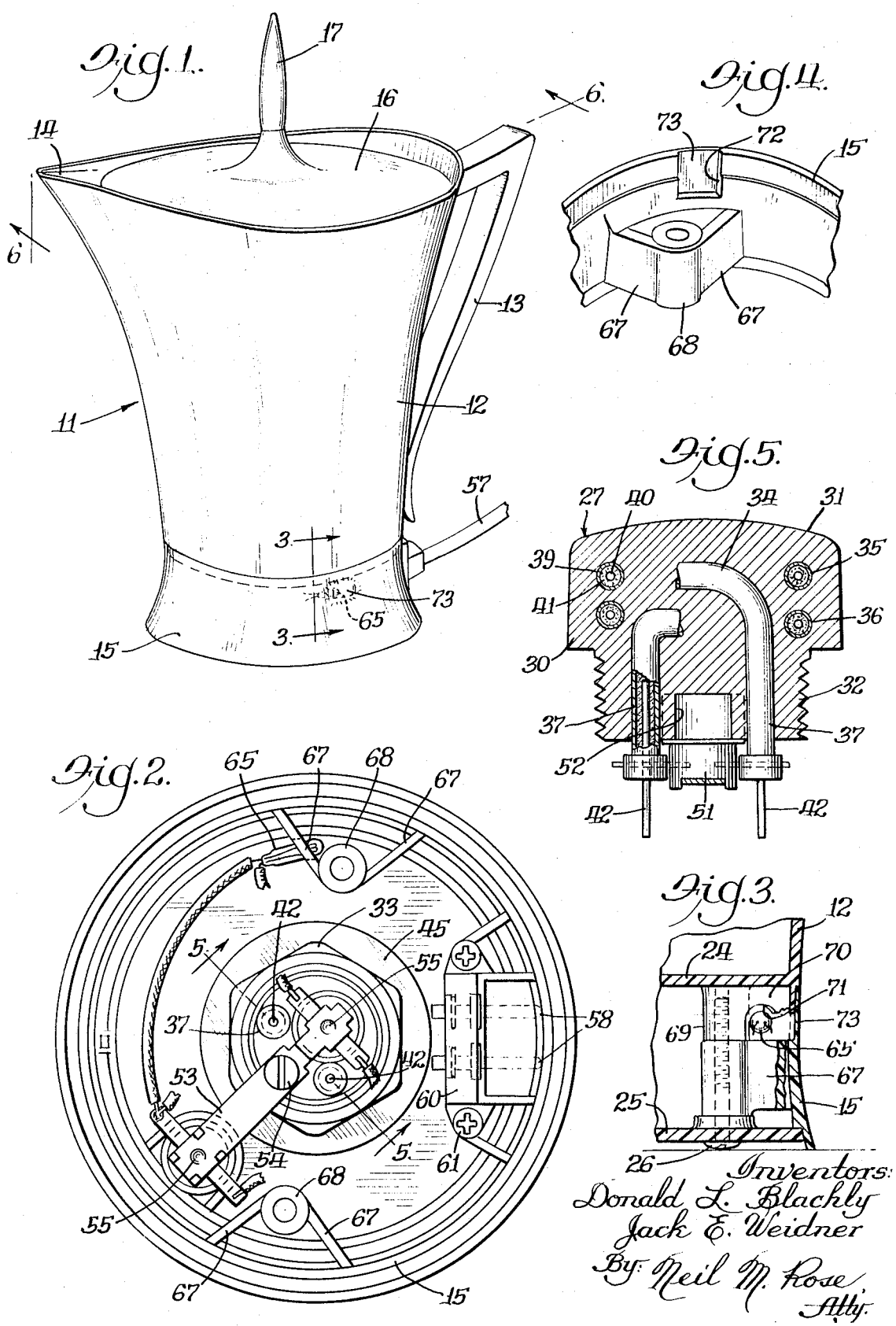

PATENTED JUL 18 1972
SHEET 2 OF 2
3,678,246
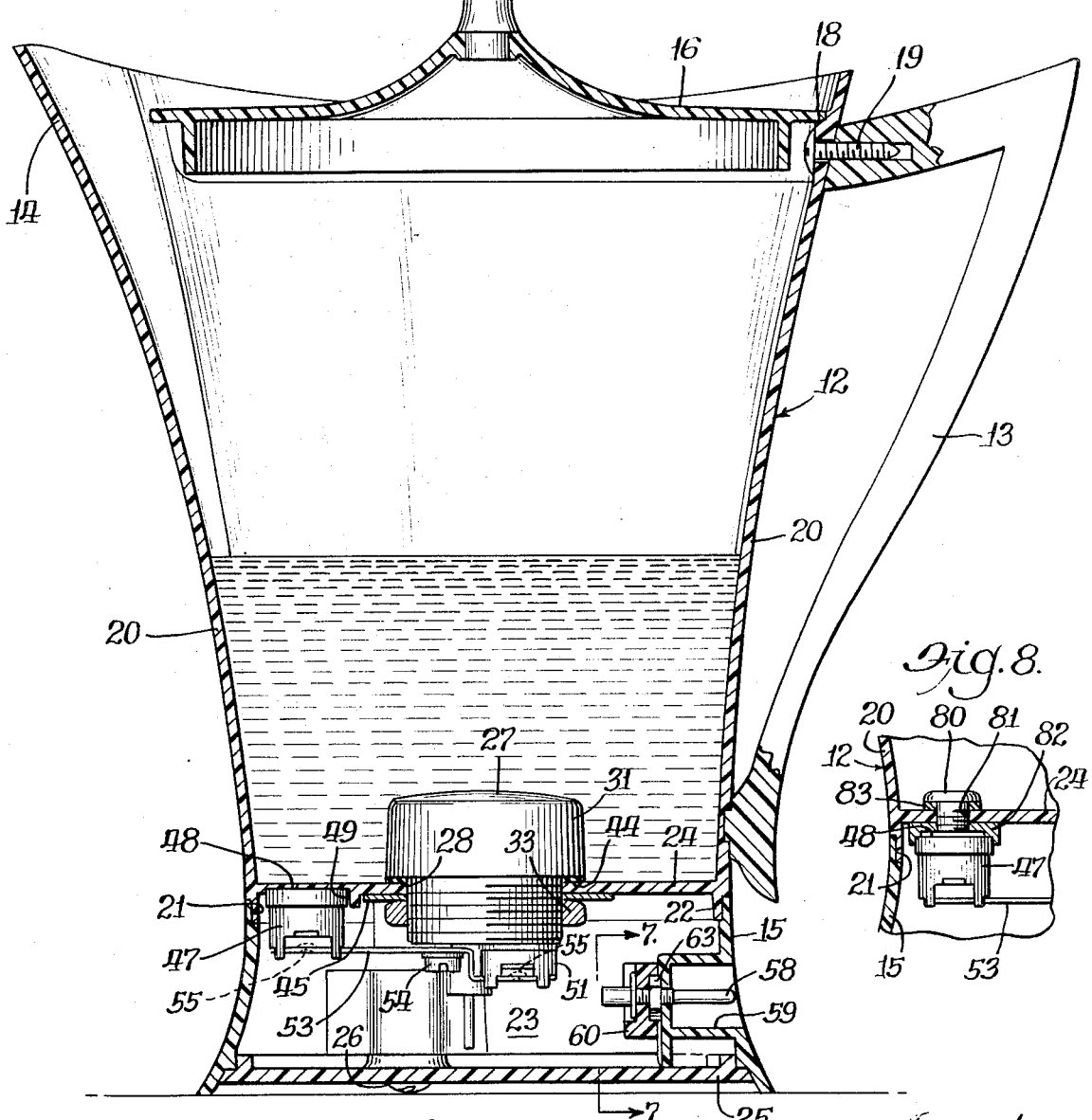
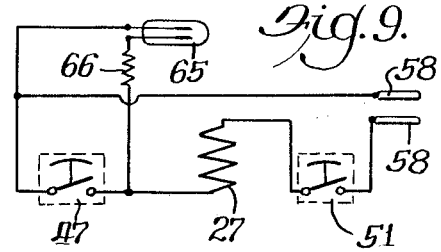
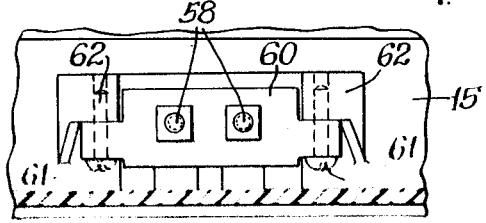
Inventors:
Donald L. Blachly
Jack E. Weidner
By Neil M. Rose
Atty.

LIQUID HEATING VESSEL

BACKGROUND OF THE INVENTION

Although plastics have achieved widespread use in recent years, there has been only limited use of plastics in connection with electric cooking and heating appliances. While plastic has been very suitable for use in knobs, bases, handles, supports, and the like, there have been problems encountered in attempting to support electrical heating elements directly on plastic vessels. There have been many complex solutions to these problems involving the use of element mounting plates of metal which assist in distributing the heat and other approaches of this type. In this connection, the patent to Wells No. 3,319,048 is noted as disclosing one such solution and also includes a discussion of other prior art approaches to these problems.

In making an electric coffeemaker or liquid heating vessel using plastic, the principal objectives must be the mounting of the heating element in such a way as to minimize the heat transfer to the plastic and the mounting of the thermostatic controls in such a way that the liquid contents of the plastic vessel may be accurately sensed for control purposes. With respect to the first of these objectives, not only is there a danger that the heating element itself will damage the plastic, but there is also a danger of the heating element generating substantial amounts of heat in the base or control area of the appliance so as to present additional problems in the operation of the thermostatic controls.

Since the walls of a plastic vessel are insulating in character, it is difficult to sense the temperature of the liquid, such liquid temperature being necessary for the purpose of controlling the energization of the electric heating element. In a metallic vessel, the thermostat need only be placed against the wall of the vessel to accurately sense the temperature of the contents. Because of the insulating character of the plastic, however, it has been found that in following the same approach in a plastic vessel the response is too slow to be considered adequate. Two prior art patents dealing with this problem of thermostat placement in a plastic vessel appliance are Wells U.S. Pat. No. 3,277,277 and Wheeler U.S. Pat. No. 3,369,105.

Another problem involves the location and placement of a fuse or safety thermostat to prevent overheating of the element in the vessel in the event that the liquid is poured out. Again, the plastic vessel presents difficulties in sensing the heat rise in the vessel when the water is poured from the vessel. By the time the heat rise could be satisfactorily sensed through the plastic, the portion of the vessel around the heating element would have already been severly damaged. Accordingly, the safety thermostat must be positioned in such a way that it will respond quickly to the temperature elevation which results from the water or liquid being removed from the vessel.

SUMMARY OF THE INVENTION

The invention relates to an appliance for heating liquid or water in which the vessel portion of the appliance is constructed entirely of plastic. The heating element is a cast in sheathed element which is mounted directly on the bottom wall of the vessel with a portion extending through the bottom wall into a base compartment. Enclosed within the compartment is a control thermostat which is mounted against the bottom wall of the vessel in a recess which provides a thin wall section in the plastic so that the thermostat will accurately sense the temperature of the liquid within the vessel. Also positioned within the base compartment is a safety thermostat which is mounted directly on the mounting portion of the cast heater element. A single bracket is used to retain both the control and the safety thermostat in position.

The heating element itself is unique in comprising a substantial die cast mass which is formed with a body portion enclosing a looped sheathed heating element within the vessel and a mounting portion of lesser size through which the ends of the sheathed heating element extend. These ends of the sheath enclose the terminals of the resistance wire which terminals are of relatively low resistance and, therefore, provide very limited wattage in the area of the bottom wall of the vessel. The enlarged body portion of the heater casting encloses most of the wattage of the element and is positioned upwardly of the bottom of the vessel in order to provide good heat transfer between the body portion and the liquid. A signal light in the base compartment is mounted adjacent the side wall thereof which side wall is made of reduced thickness so that the signal light can be observed through the wall of the base without the aid of the conventional lens normally associated with such signal lights.

It is an object of the present invention to provide an improved molded plastic water heating appliance.

It is a further object of the present invention to provide an electric liquid heating appliance having a one piece molded plastic vessel which supports directly on the bottom wall thereof a cast in sheathed heating element.

It is a further object of the present invention to provide an improved heater assembly for use in a water heating appliance having a plastic vessel portion. The heater includes a die casting having an enlarged body portion including a looped sheathed heating element and a mounting portion of reduced section through which the ends of the element extend.

Still another object of the present invention is to provide an improved electric water heating appliance having a molded plastic vessel portion and a plastic base which fit together to form a base compartment below the liquid containing portion.

Another object of the present invention is to provide an improved electrical water heating appliance having a one piece molded plastic vessel supporting a die cast heater in the wall thereof and which heater is controlled by a thermostat mounted against the plastic bottom wall of the vessel and a safety thermostat mounted on the bottom of the die cast heater.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a liquid heating vessel embodying my invention;

FIG. 2 is a bottom view of the liquid heating vessel of FIG. 1 with the bottom closure plate removed;

FIG. 3 is an enlarged fragmentary sectional view taken substantially on line 3-3 of FIG. 1;

FIG. 4 is a fragmentary perspective view of the portion of the base wherein the signal light is mounted;

FIG. 5 is a sectional view of the heating element assembly taken substantially on line 5-5 of FIG. 2;

FIG. 6 is a vertical sectional view taken on line 6—6 of FIG. 1;

FIG. 7 is a fragmentary sectional view taken on line 7—7 of FIG. 6;

FIG. 8 is an enlarged fragmentary sectional view through a portion of the bottom of the plastic vessel showing an alternative embodiment of the control thermostat mounting; and FIG. 9 is a schematic wiring diagram of the circuit embodied in the liquid heating vessel.

DESCRIPTION OF THE PREFERRED EMBODIMENT

Referring to the drawings there is shown in FIG. 1 an electric liquid heating vessel or appliance 11 which comprises an upright vessel 12 which has on one side thereof a handle 13 and a pouring spout 14 on the other side thereof. A suitable base 15 is secured to the bottom of the vessel with its side walls contoured to blend with the side walls of the vessel 12. In order to close the top opening in the vessel, a suitable cover 16 is provided which cover includes a knob 17 to facilitate removal of the cover from the vessel.

Referring to FIG. 6 of the drawings, it may be seen that the outer periphery of the cover 16 rests on an inner shoulder or ledge 18 formed in the vessel 12. The handle 13 is secured at the bottom by means of a suitable cement or adhesive while the top is retained by a screw 19 which extends through the wall of the vessel 12 in threaded engagement with the upper end of the handle 13. When it is desired to pour liquid from the vessel 12, the vessel is tipped thereby permitting the liquid to pass out of the spout 14 which is spaced from the cover 16.

It should be understood that the vessel 12 is a one piece molded plastic part fabricated from any one of the suitable synthetic resin plastics and having side walls 20 which are generally cylindrical although flared somewhat toward the top opening. At the lower end of vessel 12, the side walls 20 engage the base 15 at a stepped edge 21 which abuts a similar step 22 on the vessel 12 providing interfitting parts which are cemented together to form a unitary assembly. The base 15 and the vessel 12 together form a base compartment 23 which is defined at its top by a wall 24 which is the bottom wall of the vessel 12 and at its bottom by a closure member 25 which is secured to the base 15 by means of a pair of spaced assembly screws 26.

Supported on the vessel bottom wall 24 is the heater assembly 27 which extends through an opening 28 in the bottom wall 24. Referring to FIG. 5 of the drawings, there is shown a sectional view of the heater assembly 27. The heater assembly includes a die cast mass 30 which is formed with an enlarged body portion 31 and a lower mounting portion 32. The portion 32 is formed with threads to receive a mounting nut 33 which serves to retain the heater assembly 27 on the bottom wall 24. Cast within the mass 30 is a sheathed heating element 34 which includes two loops 35 and 36 positioned within the body portion 31 and ends 37 which extend in parallel spaced relation through the mounting portion 32, as is best shown in FIG. 5.

As is conventional, the sheathed element 34 consists of an outer protective sheath 39 within which is mounted an elongated helical coil of resistance wire 40 which, in turn, is spaced from the sheath 39 by means of packed insulating power such as magnesium oxide 41. The resistance wire 40 is connected at its ends to terminals 42 which protrude from the downwardly extending ends 37 of the sheathed element 34 as shown in FIG. 5. The terminals 42 extend substantially through the portion of the sheathed element positioned within the mounting portion 32 of the heater assembly 27 thus providing a low resistance connection to the resistance wire 40 which is positioned substantially within the loops 35 and 36 received within the body portion 31 of the heater assembly 27. With this arrangement, the sheathed heating element 34 delivers substantially all of its wattage or heat up in the body portion 31 of the die cast mass 30.

As is evident from FIG. 6, the body portion 31 is positioned entirely within the vessel 12 where it is in contact with the liquid to be heated. This liquid tends to absorb the heat rapidly and tends to prevent overheating of the bottom plastic wall 24 of the vessel 12. It should be noted that a suitable sealing ring 44 is positioned between the bottom wall 24 and the body portion 31 of the heater assembly and an enlarged washer 45 is positioned beneath the bottom wall 24. The seal 44 obviously prevents liquid from passing around the heater assembly 27 and through the opening 28 while the washer 45 is engaged by the mounting nut 33 and distributes the clamping pressure applied by the nut over a substantial portion of the bottom wall 24 to avoid cracking and galling of the plastic.

In order to control the energization of the heating element assembly 27, there is provided a control thermostat 47 which consists of a well known commercially available bimetallic switch which responds to the temperature applied to a sensing face 48 and closes a switch at a predetermined temperature level. The bottom wall 24 of the vessel 12 is formed with a shallow recess 49 which results in a thin walled section between the sensing face 48 of the thermostat 47 and the liquid contained in the vessel 12. The plastic wall thickness required for a vessel which would be strong enough for normal household use would provide substantial thermal insulation between the liquid in the vessel and any thermoresponsive means positioned exteriorly of the vessel. By providing the thin wall section at the bottom of the recess 49, the heat transfer through the bottom wall 24 in that area is such that the control thermostat 47 responds well to the temperature of the contents of the vessel 12.

A safety thermostat 51 is attached to the mounting portion 32 of the heater assembly 27. A shallow cylindrical recess 52 is provided in the bottom of the portion 32 to receive a portion of the safety thermostat 51. In order to retain the control thermostat 47 and the safety thermostat 51 in assembled relationship to the vessel 12 and the heater assembly 27, an elongated bracket 53 is secured to the mounting portion 32 by means of an assembly screw 54. The bracket 53 is provided with small spherical dimples 55 which engages the rear face of the thermostats 47 and 51 and assure the proper engagement of the thermostats against the vessel 12 and the heater assembly 27. The dimples 55 result in the retaining force of the bracket 53 being applied against the thermostats 47 and 51 in an axial direction and perpendicular to the surfaces they engage in spite of any minor twisting on the bracket 53 or unevenness in the area of the mounting portion 32 to which the bracket is assembled.

In order to supply power to the appliance 11, a suitable power cord 57 is provided which connects to terminal pins 58 mounted in spaced parallel relation in a recess 59 formed in the vessel base 15. The pins 58 are actually mounted on a support member 60 which is secured within the base compartment 23 adjacent the walls forming recess 59 by means of screws 61, as is best shown in FIG. 7. The screws 61 extend through openings in support 60 into threaded holes in integrally formed bosses 62 on the base 15. Suitable retaining nuts 63 threadedly received on the pins 58 retain the pins in assembled relation to the support 60 as shown in FIG. 6. Electrical connections are provided between the pins 58, the thermostats 47 and 51 and the heater assembly 27 as shown in the schematic wiring diagram of FIG. 9.

It is noted that the heating element 27 is connected in circuit between both of the thermostats 47 and 51 so that when these thermostats are closed, the heater 27 is connected across the terminal pins 58 and may be energized by the power cord 57. The thermostat 47 is made to specifications so that it opens the heating element circuit at a predetermined water temperature, usually somewhere close to the boiling point of water or on the order of 200° F. Because of the thermal lag in response at the thermostat location, the thermostat 47 is actually designed to open at 175° F. to achieve this water temperature. The safety thermostat 51, on the other hand, is manufactured to specifications so that it will open at approximately 300° F. in response to an overheat condition which would otherwise damage the plastic vessel 12. The safety thermostat normally does not function except in instances when the vessel 12 is empty and there is no liquid contained therein. In such a case, the insulating character of the bottom 24 would be such that the heating element 27 would heat up to dangerously high temperatures without causing the control thermostat 47 to open. The safety thermostat 51 is, however, in good heat transfer relationship to the die cast mass 31 through its being nested in the recess 52 in the mounting portion 32. As a consequence, the safety thermostat 51 responds promptly as the temperature of the heater 27 rises to the 300° level to which the thermostat is set. It is extremely important that the safety thermostat respond quickly since with the liquid removed from the vessel 12 the heater 27 has a tendency to rise in temperature very rapidly.

To indicate whether or not the contents of the vessel are up to temperature, a conventional signal lamp 65 is connected in circuit across the control thermostat 47. A resistance 66 is also included in series with the lamp 65 to provide a high resistance which limits the current to the lamp 65. When the control thermostat 47 is closed and the heating element is energized, the lamp 65 will be shorted out and not be illuminated. When the control thermostat 47 opens the circuit, the line voltage will appear across the resistance 66 and the lamp 65 thereby causing the lamp to glow indicating that the contents of the vessel are heated to the desired temperature.

The base 15 is provided with integrally molded webs 67 which connect the cylindrical side walls of the base to tubular members 68 through which the assembly screws 26 extend. The screws 26 are then received in threaded bosses 69 which extend downwardly from the bottom 24 of vessel 12. The screws 26 thus extend through the bottom closure 25, through the tubular members 68, and into engagement with the boss 69 to retain the base 15 and the closure 25 assembled to the vessel 12.

For the purpose of mounting the lamp 65 within the compartment 23, a web 70 extending outwardly from one of the bosses 69 is provided with a notch 71 as shown in FIG. 3. The lamp is thus received between the notch 71 and the web 67 positioned immediately therebelow. In order for the lamp 65 positioned within the base compartment 23 to be visible from the exterior of the compartment, the wall of the base 15 is provided with a recess 72 which at its bottom defines a vertically extending lens portion 73. The lens portion 73 is, however, an integral part of the molded plastic base 15 which is thin enough so that the light from the lamp 65 may shine through. This construction eliminates the cost of assembling a separate lens member to the side wall of the base and eliminates another opening through which splashed water or liquid may enter the base and cause problems with the electrical components contained therein. The arrangement of the lamp 65 with respect to the vessel 12 and the base 15 is best shown in FIGS. 2 and 3.

In an alternative embodiment of the invention as shown in FIG. 8 of the drawings, the control thermostat may be mounted in a different means to sense the temperature of the liquid contained in the vessel 12. In the embodiment of FIGS. 1 to 6, the control thermostat 47 was mounted in a recess 49 whereby the sensing face 48 of the thermostat was spaced from the liquid only by a thin wall portion of the bottom 24. In FIG. 8 there is shown an alternative embodiment in which a heat transfer lug 80 of aluminum or a good heat conducting material is mounted within an opening 81 in the wall 24. A suitable heat transfer member 82 is threadedly secured to the lug 80 to retain the lug 80 in assembled relationship to the bottom wall 24 and to provide a suitable member to conduct heat to the sensing face 48 of the control thermostat 47. In this embodiment, the thermostat may be mounted by means of the same bracket 53 which biases the sensing face 48 of the control thermostat 47 into good heat transfer engagement with the member 82. A suitable sealing gasket 83 is provided between the enlarged head of the lug 80 and the bottom wall 24 to prevent leakage through the opening 81. This arrangement provides an alternative approach whereby the lug 80 conducts heat rapidly from the liquid within the vessel 12 to the control thermostat 47 in spite of the insulating plastic walls within which the liquid is received. The result is a simple but effective means of achieving the desired response for the control thermostat 47.

From the foregoing description, it should be obvious that there has been provided a very simple water heating appliance which is constructed primarily of molded plastic parts which support the heater, thermostats and electrical components. The heater is so designed and arranged with respect to the control thermostat 47 and the safety thermostat 51 so as to provide safe and effective control of the heating element 27. By utilizing a cast in heater, it is possible to achieve good heat transfer to the liquid contained in the plastic vessel 12 while at the same time minimizing the heat delivered to the bottom mounting wall 24 and into the compartment 23 by having the high wattage portions of the sheathed heating element 34 in the body portion of the die cast mass 30 rather than in the mounting portion which is in the compartment 23.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A liquid heating appliance comprising a molded integral plastic vessel having side walls, a bottom wall and an open top, an electrical heater mounted on said bottom wall and supported at least partially within said vessel and extending through an opening provided in said bottom wall, said heater having a body portion positioned within said vessel and a mounting portion of reduced section extending through said opening and extending substantially below said bottom wall, said heater comprising a casting within which is enclosed a sheathed heating element having at least one loop in said body portion and spaced end portions extending through said mounting portion, coiled resistance wire received within said loop and elongated low resistance terminal members connected to said resistance wire and positioned in said end portions, said low resistance terminal members extending substantially through said mounting portion to minimize the heat delivered to said mounting portion, said terminal members being insulated from and extending outwardly of said mounting portion for connection to a source of electrical power, means supporting said vessel in an upright position and enclosing said terminal members.

2. A liquid heating appliance comprising a molded integral plastic vessel having side walls, a bottom wall and an open top, an electrical heater supported at least partially within said vessel and extending through an opening provided in said bottom wall, said heater having a body portion positioned within said vessel and a mounting portion of reduced section extending through said opening, said heater comprising a casting within which is enclosed a sheathed heating element having at least one loop in said body portion and spaced end portions extending through said mounting portion, coiled resistance wire received within said loop and elongated low resistance terminal members connected to said resistance wire and positioned in said end portions, said terminal members being insulated from and extending outwardly of said mounting portion for connection to a source of electrical power, said heater is connected in circuit with a control thermostat and a safety thermostat, said control thermostat being mounted on said plastic bottom wall in good heat transfer relation to the liquid contents of said vessel, means supporting said vessel in an upright position and enclosing said terminal members.

3. The liquid heating appliance of claim 2 wherein said safety thermostat is mounted on said mounting portion of said casting to respond to overheating of said heater when said vessel is empty.

4. A liquid heating appliance comprising a molded integral plastic vessel having side walls, a bottom wall and an open top, an electrical heater supported at least partially within said vessel and extending through an opening provided in said bottom wall, said heater having a body portion positioned within said vessel and a mounting portion of reduced section extending through said opening, said heater comprising a casting within which is enclosed a sheathed heating element having at least one loop in said body portion and spaced end portions extending through said mounting portion, coiled resistance wire received within said loop and elongated low resistance terminal members connected to said resistance wire and positioned in said end portions, said terminal members being insulated from and extending outwardly of said mounting portion for connection to a source of electrical power, said heater is connected in circuit with a control thermostat and a safety thermostat, said control thermostat being mounted on said plastic bottom wall and being set to open the heater circuit when the liquid in the vessel is close to the boiling point of water, said safety thermostat being supported on said heater casting and being set to open said heater circuit at a substantially higher temperature than said control thermostat but below the temperature at which said plastic would be damaged, means supporting said vessel in an upright position and enclosing said terminal members.

5. The liquid heating appliance of claim 4 wherein said control thermostat and said safety thermostat are clamped against said bottom wall and heater respectively by a bracket which extends between said thermostats and which is secured to said heater intermediate said thermostats.

6. A liquid heating appliance comprising a molded integral plastic vessel having side walls, a bottom wall and an open top, an electrical heater supported at least partially within said vessel and extending through an opening provided in said bottom wall, said heater having a body portion positioned within said vessel and a mounting portion of reduced section extending through said opening, said heater comprising a casting within which is enclosed a sheathed heating element having at least one loop in said body portion and spaced end portions extending through said mounting portion, said vessel being supported by an annular plastic base, said base having a stepped edge at the top thereof which engages a complimentary stepped edge at the bottom of said vessel, said vessel bottom wall and said base forming a base compartment which is closed at the bottom by a plastic closure plate, assembly means extending through said plate and said base into threaded engagement with said vessel.

7. The heating appliance of claim 6 including a signal light in said base compartment connected in circuit with said heater, a recessed wall portion on said base adjacent said light being sufficiently thin so that said light may be observed through the wall of said base when it is illuminated.

8. The heating appliance of claim 7 wherein said heater is connected in circuit with a control thermostat, said thermostat being mounted on the underside of said bottom wall, said bottom wall adjacent to said thermostat being thin to provide good heat transfer between said thermostat and the contents of said vessel.

9. The heating appliance of claim 1 wherein said body of said casting is cylindrical in shape and encloses two circular connected loops of sheathed element positioned one above the other, said mounting portion being of reduced diameter compared to said body portion and being threaded to receive an assembly nut which tightens against the bottom wall of said vessel.

10. Water heating appliance comprising a one piece integral plastic molded cup shaped vessel having cylindrical side walls and a bottom wall, an electrical heater assembly including a sheathed element cast into a heat transfer mass, said mass having a body portion in said vessel and a mounting portion extending through an opening in said bottom wall, said body portion enclosing a portion of said element including a coiled resistance wire and said mounting portion enclosing a portion of the element having a low resistance terminal connection, a contact thermostat mounted on the plastic bottom wall of said vessel in good heat transfer relation to the liquid in said vessel to sense its temperature, a safety thermostat supported in good heat transfer relation to said mounting portion, said control thermostat and said safety thermostat being connected in series with said sheathed heating element, means supporting said vessel in an upright position and enclosing said terminal connection.

11. The heating appliance of claim 10 wherein said bottom wall is sealed to said heater assembly around said opening, said bottom wall being recessed to provide an area of reduced thickness between said control thermostat and the center of said vessel.

12. The heating appliance of claim 10 including an elongated retaining bracket secured intermediate its ends to said mounting portion of said heater assembly, one end of said bracket engaging said control thermostat and urging it into engagement with said vessel and the other end engaging said safety thermostat and urging it into engagement with said mounting portion.

13. The heating appliance of claim 12 wherein said sheathed element includes spaced parallel ends which extend downwardly from said mounting portion, said bracket extending between said parallel ends and being mounted to said heater assembly between said parallel ends, said safety thermostat being received in a downwardly facing recess spaced equidistant from said parallel ends.

14. The water heating appliance of claim 10 wherein said element has at least one loop in said body portion and only low wattage terminal portions extending through said mounting portion.

15. The water heating appliance of claim 10 including a cup-shaped base which abuts the bottom of said vessel to form a closed base compartment having terminal pins extending through a side wall of said base, said sheathed element having its wattage concentrated in said body portion to provide maximum heat transfer to said liquid and minimize heat delivered to said base compartment.

* * * * *